US006712574B1

United States Patent
Roopnarine (10) Patent No.: US 6,712,574 B1
(45) Date of Patent: Mar. 30, 2004

(54) QUICK INSERTION AND REMOVAL FASTENER

(75) Inventor: Roopnarine, New York, NY (US)

(73) Assignee: Honeybee Robtotics, Ltd., New York, NY (US)

( * ) Notice: Subject to any disclaimer, the term of this patent is extended or adjusted under 35 U.S.C. 154(b) by 0 days.

(21) Appl. No.: 09/995,508

(22) Filed: Nov. 27, 2001

Related U.S. Application Data
(60) Provisional application No. 60/250,294, filed on Nov. 28, 2000.

(51) Int. Cl.[7] ............................................... F16B 37/08
(52) U.S. Cl. ........................ 411/433; 411/267; 411/270
(58) Field of Search .............................. 411/265, 267, 411/270, 433, 437

(56) References Cited

U.S. PATENT DOCUMENTS

| | | | |
|---|---|---|---|
| 5,340,252 A | | 8/1994 | Weddendorf |
| 5,613,816 A | * | 3/1997 | Cabahug .................. 411/270 X |
| 5,732,989 A | * | 3/1998 | Stevenson et al. ...... 411/433 X |
| 5,800,108 A | * | 9/1998 | Cabahug .................. 411/267 X |
| 6,361,260 B1 | * | 3/2002 | Schirrmacher .......... 411/270 X |

FOREIGN PATENT DOCUMENTS

| | | | | |
|---|---|---|---|---|
| FR | 2492019 | * | 4/1982 | .................. 411/433 |

* cited by examiner

Primary Examiner—Neill Wilson
(74) Attorney, Agent, or Firm—Leighton K. Chong; Ostrager Chong & Flaherty (Hawaii)

(57) ABSTRACT

A quick insertion fastener has an internally threaded first member ("nut") adapted to be quickly attached and tightened on an externally threaded second member ("bolt"). The nut is formed with a casing with an internal frusto-conical front surface, a plurality of threaded shell segments contained in the casing having external frusto-conical front surfaces which abut the front surface of the casing, a spring member positioned at a rear part of the casing which elastically holds the rear ends of the shell assembly together, and an end retainer provided at the rear part of the casing having a taper for engaging the rear ends of the shell assembly and displacing them radially apart when the shell assembly is displaced axially toward the end retainer by insertion of the bolt. This allows the bolt threads to move without interference past the internal threads of the shell segments. When the insertion force of the bolt is released, the spring member urges the shell segments together so that the internal threads of the shell assembly become engaged with the bolt, and the nut can be tightened on the bolt. The spring member may be a radial spring or O-ring, or in the alternatively may be a wave compression spring, segmented spring, circumferential or axial leaf springs, or a flexure spring formed integrally with the end retainer. The nut may also be configured with an external sleeve member for pulling the shell assembly back relative to the nut casing for quick disengagement from the fastener.

18 Claims, 12 Drawing Sheets

QUICK INSERTION AND REMOVAL FASTENER

This U.S. patent application claims the priority of U.S. Provisional Application No. 60/250,294 filed on Nov. 28, 2000, entitled "Quick Insertion Nut", by the inventor in common herein.

The subject matter of this U.S. patent application was developed in part under contract with the U.S. Government, National Space and Aeronautics Administration, Contract No. NAS5-32813. The U.S. Government possesses certain rights in the invention.

TECHNICAL FIELD

This invention generally relates to fasteners, and, particularly, to a nut having an improved structure allowing quick insertion of a threaded bolt and removal thereof.

BACKGROUND OF INVENTION

The prior art has shown various structures for threaded fasteners, such as an internally threaded nut, which may be quickly attached to an externally threaded member such as a bolt, screw or stud, without the time consuming need to rotate the nut a great number of revolutions on the externally threaded member. As illustrated in U.S. Pat. Nos. 3,695,139, 4,378,187, or 5,324,150, fasteners of the quick connecting type generally have an internally threaded nut formed with two or more segments or shells which separate to allow an externally threaded member (bolt) to be pushed into the threads, then close together for tightening over fewer thread pitches on the bolt than would normally be the case with a solid nut. There is typically a frusto-conical surface at the front side (toward the bolt) inside the body of the nut casing to force the segments or shells inwardly for tightening, this surface being at a large angle relative to the axis of the nut. Additionally, some prior devices employ a second frusto-conical surface at the rear of the nut casing and corresponding conical surfaces formed on the threaded segments for spreading or separating the segments when a bolt or the like is inserted.

In U.S. Pat. No. 5,340,252 to Weddendorf, a quick connect fastener has a nut formed with a plurality of internally threaded shells having small-angle frusto-conical external surfaces abutting and cooperating with an internal frusto-conical surface at a front end of the nut casing (smaller-diameter end facing toward the position of an externally threaded bolt). The shells include annular internal grooves at the front and rear sides thereof for receiving spring clips which have a C-shape and are snapped into the respective grooves. The spring clips bias the shells radially outwardly, tending to separate them, i.e., to spread them apart, and thus urge the conical external surfaces of the shells against the conical internal surface of the nut casing, and thus urge the shells rearwardly along the surface of the nut casing toward its larger diameter end. A coil spring is disposed within the nut casing at the rear (larger-diameter) end abutting the rear ends of the shells and urging them forward toward the front end. Prior to use, the coil spring overcomes the opposing force of the spring clips and holds the shells against a stop at the front end of the nut casing. When the bolt is pushed into the smaller-diameter end of the nut casing (or vice versa), the shells are driven away from the stop at the front end of the casing and are urged radially outwardly by the force of the clips. The inside threading diameter of the shells is thereby increased to allow the bolt threads to push past the internal nut threads. When the pushing force is released, the shells are urged toward the front end of the nut casing by the coil spring and are forced radially inwardly by contact of the conical external surfaces of the shells with the conical interior surface of the nut casing. As the shells are moved toward the front end, they are urged radially inward and their internal threading then engage with the external threading of the bolt, and the nut can be increasingly tightened on the bolt in a small number of turns.

However, the quick connecting nut assemblies of the prior art, such as shown in U.S. Pat. Nos. 3,695,139, 4,378,187 and 5,324,150, employ a relatively large taper angle in the nut casing in order to facilitate the spreading apart of the shells when a bolt is inserted. However, the large taper angle provides contact against the external surfaces of the shells for tightening them only near the front end of the nut casing. This means that the forces on the threads of the shells, after the system is preloaded, have a weaker load path to ground (or the casing) which reduces the strength of the fastener assembly. While the nut assembly in U.S. Pat. No. 5,340,252 employs a smaller taper angle for greater tightening force, it requires the use of the C-shaped (expansion) spring clips at both ends to spread the shells when a bolt is pushed into the assembly, and the coil (compression) spring at the rear to overcome the force of the C-shaped spring clips to urge the shells back toward the front end of the nut casing for tightening down.

SUMMARY OF INVENTION

A principal object of the present invention is to provide a quick insertion fastener with an improved configuration of shell assembly that allows quick insertion of a threaded member and tightening (preloading) with a small number of turns, while also ensuring a distributed contact between the shell assembly and the nut casing to increase the strength of the fastener assembly. The shell assembly is designed to perform its function effectively while avoiding the need for multiple parts, multiple springs, and a complex assembly. A further object of the invention is to also provide a means for quick removal of the fastener.

In accordance with the present invention, a quick insertion fastener has an internally threaded first member adapted to be quickly attached and tightened on an externally threaded second member inserted therein. The first member is formed with: (a) a casing having an internal surface at a front part thereof in a frusto-conical shape with a taper angle "$\alpha$", said front part of the casing being oriented toward the second member for insertion thereof; (b) a plurality of shell segments radially arranged on a fastener axis to form a displaceable shell assembly contained in said casing, each of said shell segments having a similar shape with an external surface at a front end thereof tapered in a frusto-conical shape with a taper angle "$\alpha$" corresponding to the taper angle of the internal front surface of said casing and internal threads having a thread height "h" and pitch "p"; (c) a spring member positioned at a rear part of said casing which is arranged to provide an elastic force to elastically retain rear ends of the shell segments to be axially movable in said shell assembly; and (d) an end retainer provided at the rear part of said casing having a taper for engaging the rear ends of the shell segments and displacing them radially as they are moved axially toward the end retainer such that the shell segments are spread apart radially to allow insertion of the second member past the internal threads of the shell segments when the shell segments are pushed axially by the force of insertion of the second member into the front part of said casing and toward the end retainer at the rear part of said casing.

The shell assembly is configured such that when the second member (e.g., a bolt) is inserted with an insertion force into the front part of the first member (e.g., a nut), the shell assembly is displaced axially toward the rear part of the nut casing by a distance "δ" which is equal to h/tan(α/2), and the shell segments are moved apart radially by a distance "h" against the elastic force of the spring by the taper of the end retainer. This allows the internal threads of the shells to clear the thread height "h" and allow the external threads of the bolt to be inserted past the internal threads of the shell segments without interference. When the insertion force of the bolt is released, the spring member urges the shell segments together, and the internal threads of the shell assembly become engaged with the external threads of the bolt, so that the nut can now be tightened with a small number of turns on the bolt.

In a preferred embodiment, the spring member is constituted by a radial spring or O-ring that holds together flanges extending from the rear ends of the shell segments, and the end retainer has a tapered annular collar which engages the flanges of the shell segments. As the shell assembly is displaced axially under the insertion force of the bolt, the shell segments are spread apart radially by engagement of their rear ends with the taper of the annular collar. When the insertion force of the bolt is released, the O-ring urges the shell segments together to engage the threads of the bolt so that the nut can be tightened on the bolt. As the shell assembly only has to be moved at most the displacement distance "δ" to bring the external surfaces thereof in abutment with the internal front surface of the nut casing, the nut can be tightened (preloaded) with a relatively few number of turns N equal to δ/p, or h/(p×tan(α/2)).

In other embodiments, the spring member may be formed integrally with the end retainer. For example, it may be a wave compression spring, a segmented spring, circumferential or axial leaf springs, or a flexure spring attached to the end retainer. The shell segments, spring member and end retainer may also be configured to cooperate with an external sleeve member for pulling the shell assembly back relative to the nut casing for quick disengagement from the fastener. Radial, axial, or flat surfaced key elements may also be provided between the nut casing and the shell segments to prevent relative rotation between the parts when the fastener is subjected to preloading forces.

Other objects, features, and advantages of the present invention will be explained in the following detailed description of the invention having reference to the appended drawings.

BRIEF DESCRIPTION OF DRAWINGS

FIGS. 1 a–1g are schematic views showing an exemplary embodiment of a quick insertion fastener.

DETAILED DESCRIPTION OF INVENTION

In accordance with the present invention, a quick insertion fastener is formed with an internally threaded first member and an externally threaded second member that is inserted in or applied to the internally threaded first member. In the following example, a common type of fastener is described in which the internally threaded member is referred to as a "nut", and the externally threaded member is referred to as a "bolt". However, it is to be understood that the pprinciples of the invention may equally be applied to other types of fastener combinations, such as threaded screw and screw part, threaded rod and rod coupling, etc.

Figure 1A:
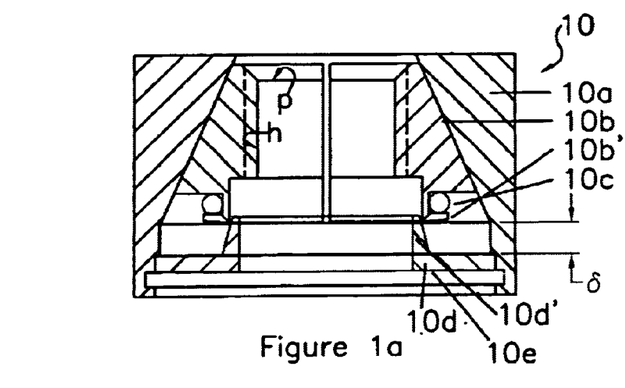
Figure 1B:
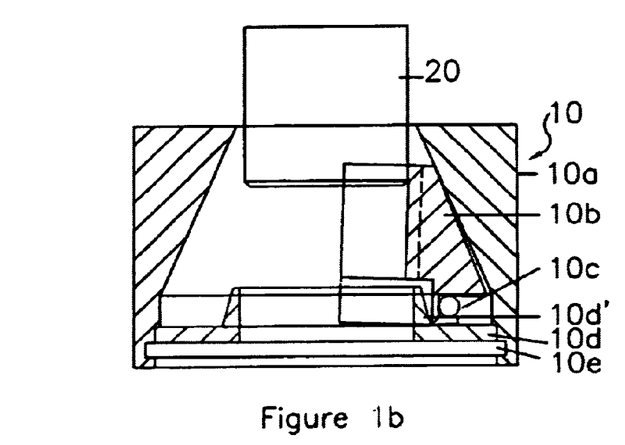
Figure 1C:
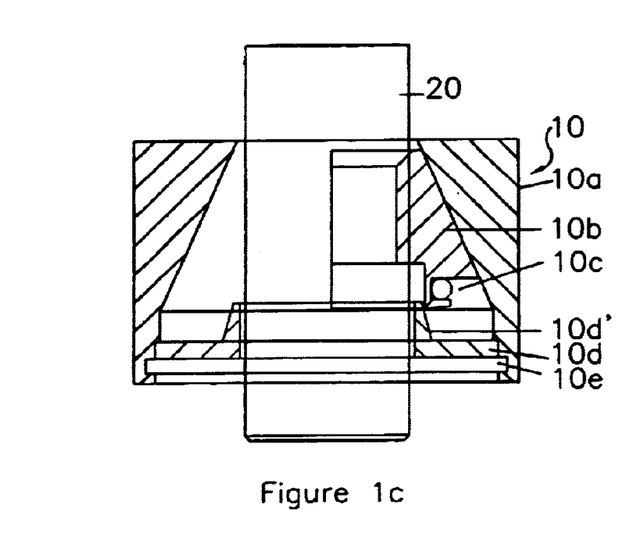
Figure 1D:
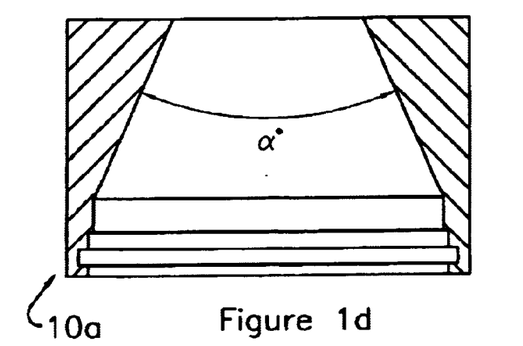
Figure 1E:
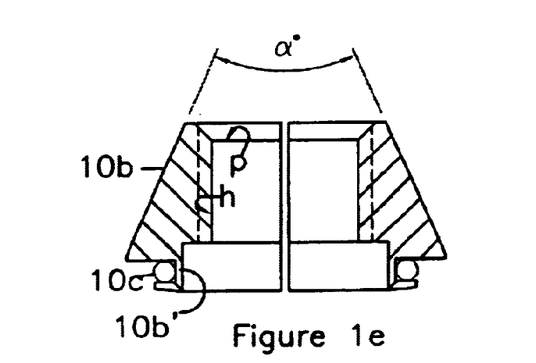
Figure 1F:
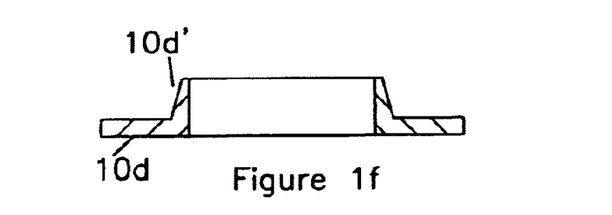
Figure 1G:
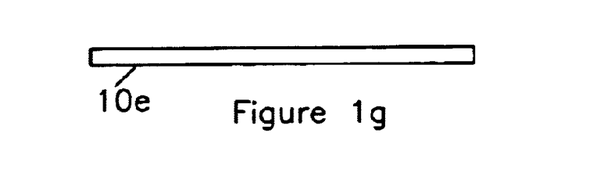

Referring to FIGS. 1a, 1b, and 1c, an exemplary embodiment of a quick insertion fastener is shown having a nut 10 formed by an outer nut casing 10a having an internal tapered surface in a frusto-conical shape of a taper angle "α", a plurality of shell segments 10b retained within the nut casing, each similarly shaped with an external surface tapered in a frusto-conical shape of taper angle "α" and having internal threads (dashed lines) of thread height "h" and pitch "p", a radial spring or O-ring 10c held in an external groove formed in flanges 10b' on the rear ends of the shell segments for elastically holding the shell segments together, an end retainer cover 10d for retaining the shell assembly provided with an annular collar 10d' having a given height and taper angle, and a retaining ring 10e fitted in a groove in the nut casing 10a to hold the end retainer cover 10d in place against a shoulder in the nut casing. The tapered internal surface of the nut casing 10a and the tapered external surfaces of the shells are located toward a front end of the nut which faces toward the position of bolt 20 to be inserted in the nut 10. The rear ends of the shells 10b and the tapered collar of the end retainer cover 10d are located toward a rear end of the nut which faces away from the entry position of the bolt.

In FIG. 1a, the nut assembly is in its nominal configuration. The compression force of the radial spring or O-ring 10c presses the rear ends 10b' of the shells 10b together and forces them toward the front end of the nut along the tapered collar 10d' on the end retainer cover 10d and against the tapered internal surface of the nut casing 10a. The location of the one spring 10c at the rear ends of the shell assembly is a distinguishing feature of the invention and is critical to its operation because: (1) it locates the shell assembly in the casing without requiring any other springs; (2) it keeps the shells together to form an essentially complete assembly; (3) the force required to extend the spring (move the shells radially outwards) is applied near the spring via the taper on the end retainer cover; (4) it enhances the pivoting action of the front end of the shells; and (5) it allows the front ends of the shells to be made with wide-angle conical surfaces which improves the force distribution on the system.

FIG. 1b shows the configuration of the nut 10 after the initial insertion of a bolt 20.

When the end of the bolt 20 is inserted in the front end of the nut, the shells 10b elastically held together by the spring member are pushed back along the nut axis toward the rear end of the nut. The shell assembly becomes seated against the end retainer cover, and the shell segments are rotated (pivoted) about the point of contact with the retainer collar so as to spread the front ends of the shell segments apart and minimize interference between the threads of the bolt past the threads of the segments. The tip of the bolt can thus ratchet over the shell threads and the pivoting action is continued as the bolt is further inserted.

The rear end of the shells can be pushed back a maximum translation distance "δ" along the height of the retainer collar 10d'. The front ends of the shells can be pushed apart by a displacement distance "h". Since the external surfaces of the shells 10b slide apart in contact with the taper angle "α" of the internal surface of the nut casing 10a, the displacement distance "h" is determined by the following relationship:

$$\delta = h/\tan(\alpha/2)$$

In this case, the translation distance "δ" is selected relative to the taper angle "α" such that the displacement distance "h" is equal to the height of the fastener threads, so that the threaded end of the bolt can be pushed into the nut and spread-apart shells with little resistance as it moves past the threads of the shells.

FIG. 1c shows the configuration of the nut after the bolt has been fully inserted and the shell assembly has been tightened on it. When the thrust force on the bolt is released (the user has inserted the bolt into the nut at the desired position), the force pushing on the shell assembly axially is released. As a result, the O-ring presses the rear ends of the shells back together and the threads of the shell assembly become engaged with the threads of the bolt. The nut can now be tightened on the bolt to the desired preloading force through the engagement of the threads. As the nut is tightened, the shell assembly is moved relative to the bolt such that its front end makes contact with the internal surface of the nut casing and removes any free play from the system. The nut and shell assembly need only be tightened a few turns before all free play is removed and the nut becomes fully preloaded on the bolt.

The translation distance "δ" (axial displacement) of the shell assembly allowed by the retainer collar is selected to allow the shell segments to move apart a displacement distance sufficient to allow the bolt threads to move past the nut threads. This is also the distance the shell assembly needs to translate back toward the front end of the nut casing before the fastener assembly can be preloaded. The number of revolutions, N, of the bolt relative to the nut (or vice-versa) needed to remove the free play from the system and allow the system to be tightened to the desired preloading force is therefore related to the pitch p of the threads, as follows:

$$N = \delta/p = h/(p \times \tan(\alpha/2))$$

Since, for a given bolt size, the thread height "h" and pitch "p" are fixed, the one variable that affects the number of revolutions required to ready the system for preloading is the included angle "α" of the taper in the nut casing. A small taper angle "α" is preferred for better distribution of pre-loading forces across the co-acting surfaces of the shell assembly and internal surface within the nut to thereby increase the strength of the fastener. The taper angle "α" and the translation distance "δ" are therefore selected for the best combination of small number of turns for preloading and the handling of the desired levels of preloading forces.

FIGS. 1d, 1e, 1f, and 1g show the casing, shells, end retainer cover, and retaining ring of the nut components separately.

Figures 2A, 2B, 2C:
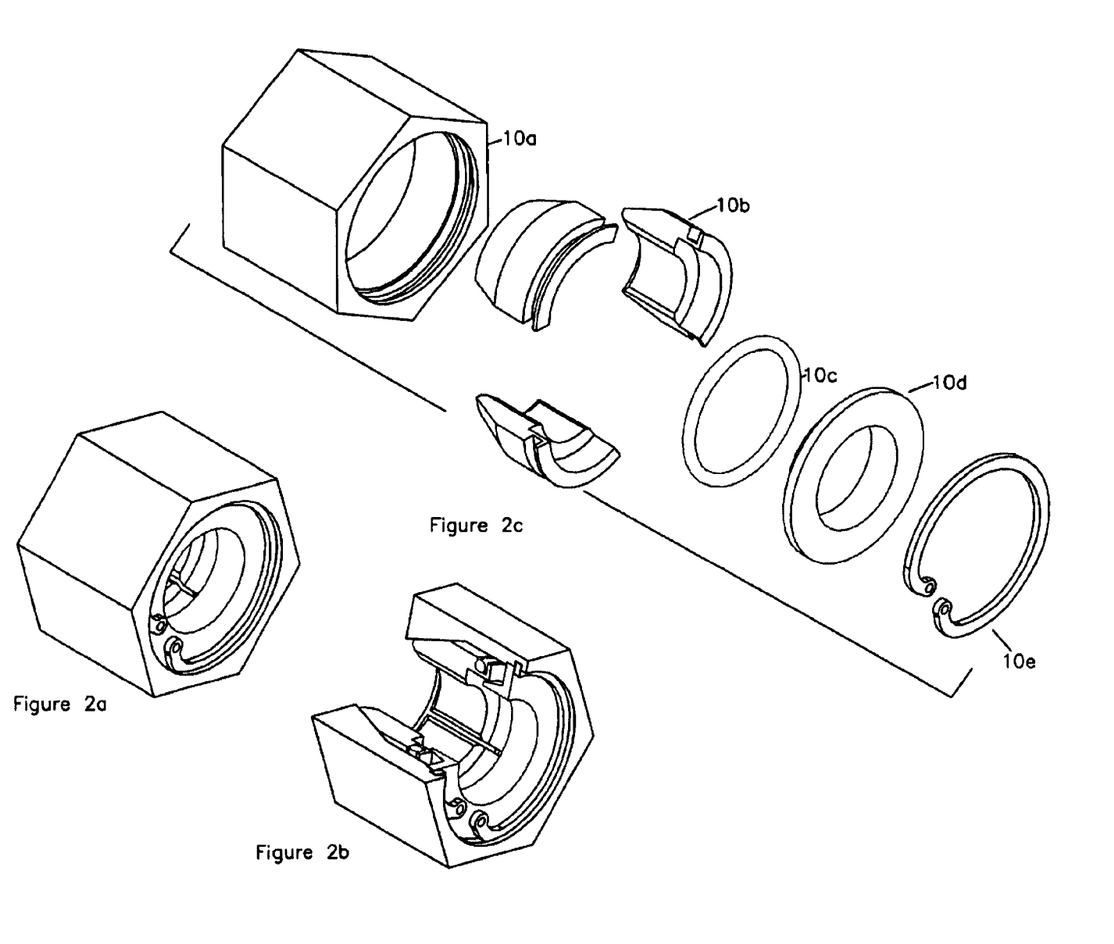
FIGS. 2a, 2b, and 2c are an assembled view, a cut-away view, and an exploded view, respectively, of the above-noted embodiment of the invention

FIGS. 2a, 2b, and 2c show an assembled view, a cut-away view, and an exploded view, respectively, of the preferred embodiment of the invention shown schematically in FIGS. 1a–1g. The shell segments 10b are preferably three or more in number. They are held together by the circular spring or O-ring 10c to form a single assembly with internal threads. This assembly is then inserted into the tapered casing 10a which contains the shells and provides a reaction surface for the forces generated when the system is preloaded. The assembly is held at the rear end by the end retainer 10d and retaining ring 10e.

The shells may be keyed by key elements (described with other embodiments below) to prevent relative rotation in the casing during preloading. There are a number of approaches that may be used to key the shell assembly to the casing, e.g., a single pin (key) can be located in the casing radially or axially such that it is always interfaced with an opposite feature, i.e., a groove, in one of the shells or vice-versa. These key elements can also function as an axial retainer for the shell assembly or a separate retainer can be used for this purpose.

The retaining ring 10e could be eliminated in preference for securing the end retainer directly to the casing via crimping or welding. The advantage of using the retaining ring is that the internal elements (the shells and spring) of the nut can be replaced, if desired.

Figure 3:
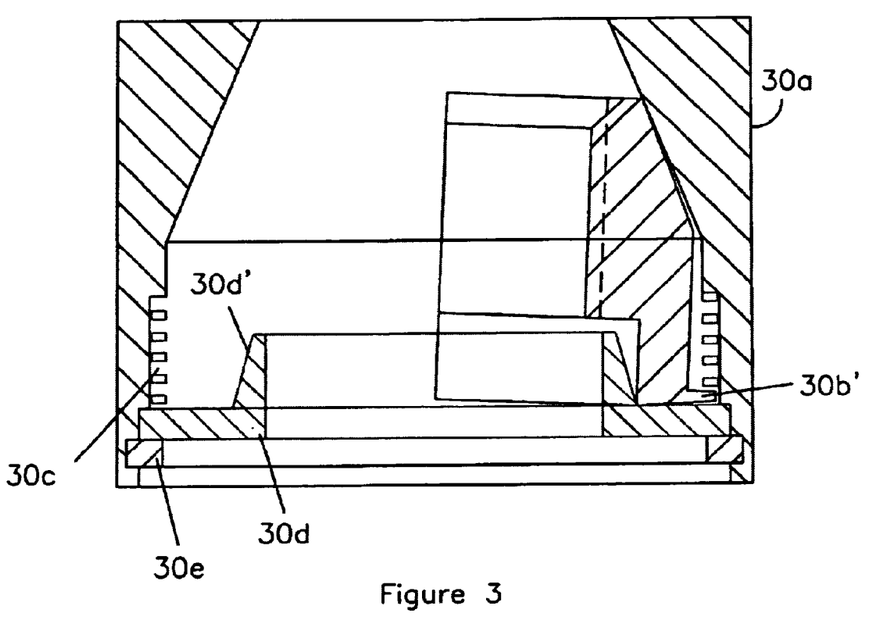
FIG. 3 is a schematic side view of another embodiment of the fastener using a compression wave spring

In FIG. 3, another embodiment of the fastener system has the radial spring or O-ring replaced by a compression wave spring 30c which maintains contact between the retainer cover 30d and the shells 30b. The end faces of the shell flanges 30b' are slightly angled (less than 10 degrees) so that when they make contact with the retainer 30d, the shells can pivot with their front ends in contact with the tapered internal surface of the casing 30a, similar to the configuration shown in FIG. 1b. The wave compression spring tends to push the rear ends of the shell segments toward the rear end of the nut, and the front ends of the shell segments are slightly radially displaced by the tapered retainer end faces toward the tapered internal surface of the nut casing. Under the insertion force of the bolt, the shell segments are displaced radially and allow the threads of the bolt to move past the internal threads of the shell segments.

Figures 4A, 4B, 4C:
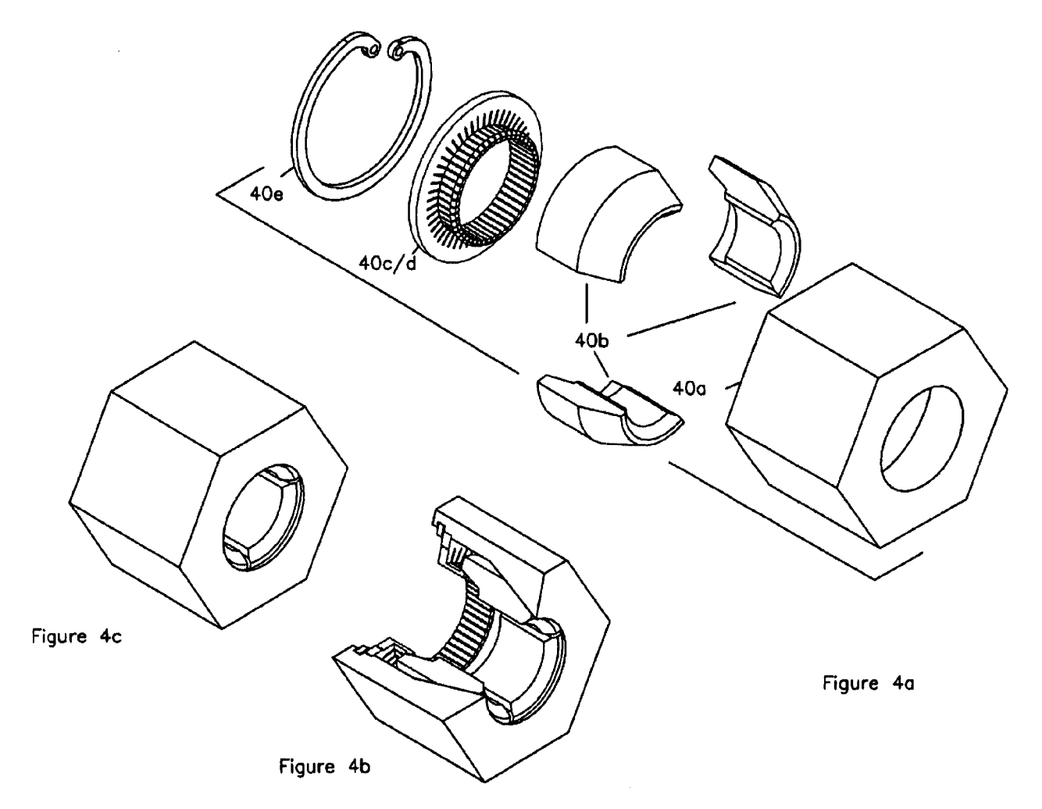
FIGS. 4a, 4b, and 4c show an exploded view, a cut-away view, and an assembled view, respectively, of an embodiment in which a radial spring is made an integral part of an end retainer.

FIGS. 4a, 4b, and 4c show an exploded view, a cut-away view, and an assembled view, respectively, of another embodiment in which the radial spring is made an integral part of the end retainer. For example, the spring 40c/d is comprised of a number of smaller spring segments which have been cut into a retainer piece. In this embodiment, the taper that was characteristic of the retainer in the previous embodiments is now machined into the internal surfaces of the shell segments 40b which are in spring-biased contact with the ends of the spring segments 40c. As an alternative, the spring may be formed as arc segments of the same number (three) as the shell segments and act as circumferential or axial leaf springs. The spring segments urge the shell segments elastically radially apart against the tapered internal surface of the nut casing 40a. Under the insertion force of the bolt, the shell segments are displaced back and their tapered inner surfaces are pushed against the spring segments, thus spreading them apart. When the insertion force of the bolt is released, the spring segments again urge the shells back toward the front end of the nut casing.

Figures 5A, 5B, 5C:
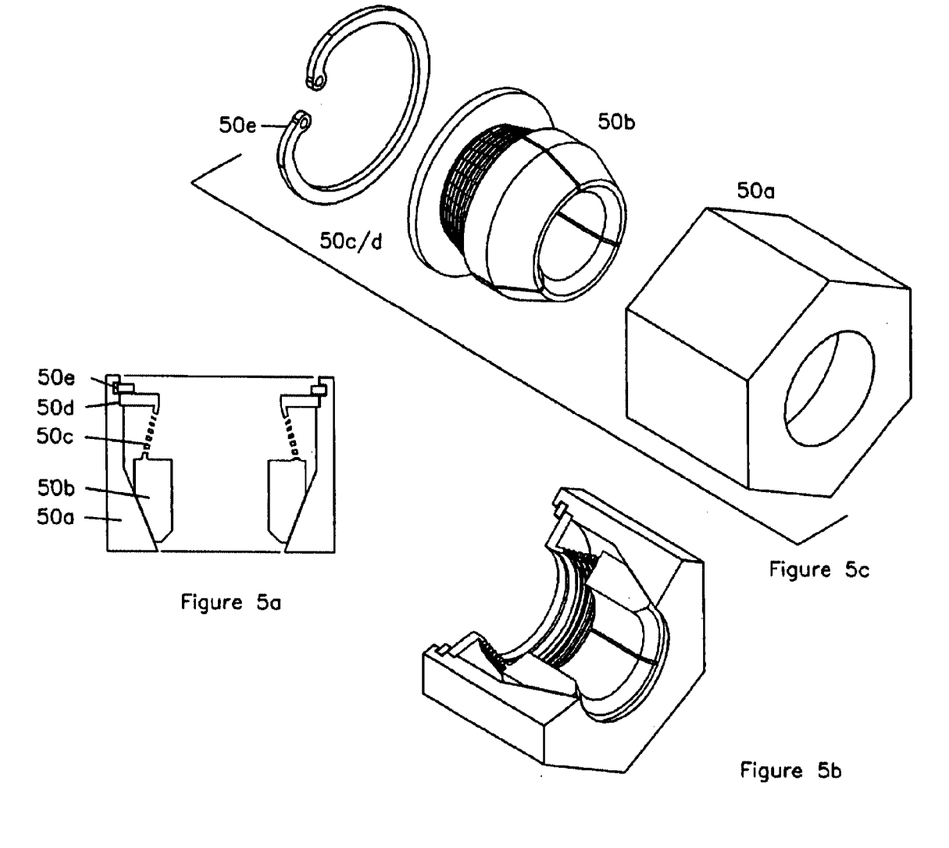
FIGS. 5a, 5b, and 5c show a schematic side view, a cut-away view, and an exploded view, respectively, of an embodiment in which a flexure spring is formed integrally with an end retainer.

FIGS. 5a, 5b, and 5c show a schematic view, a cut-away view, and an exploded view, respectively, of another embodiment in which the shell segments 50b are integrally formed with flexure springs 50c and the end retainer 50d. In this embodiment, the flexure spring is formed with an inclined (tapered) configuration and mounting at an angle to the end retainer such that movement of the shell segments back also results in their spreading apart to provide clearance for the fastener insertion.

Figures 6A, 6B, 6C:
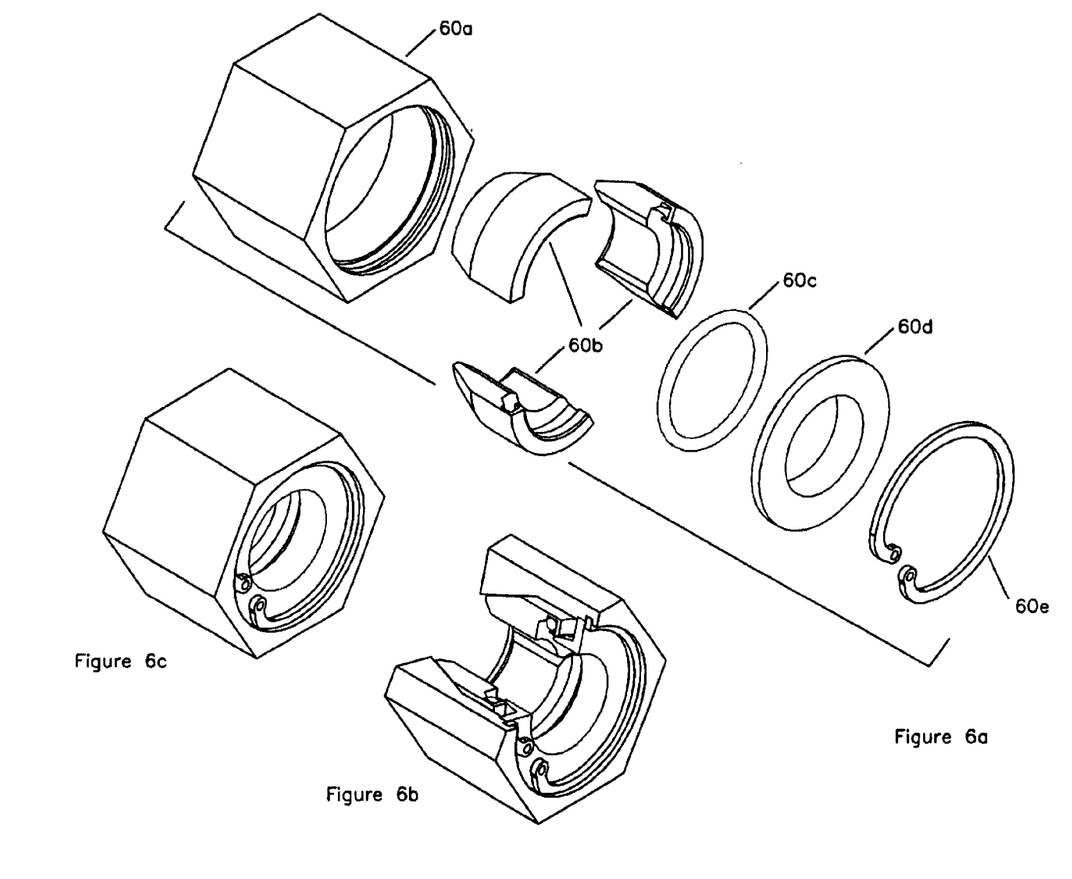
FIGS. 6a, 6b, and 6c show an exploded view, a cut-away view, and an assembled view, respectively, of an embodiment using an internally mounted radial spring or O-ring.

FIGS. 6a, 6b, and 6c show an exploded view, a cut-away view, and an assembled view, respectively, of another embodiment in which a radial spring or O-ring 60c is inserted in an internal groove in the shell segments 60b near the base of the shell segments and which performs the same finction as the external radial spring or O-ring in the first-described embodiment. In this instance, however, the spring may be either a radial spring or a c-clip. The former will act in exactly the same way as the first embodiment, but the latter will cause the shells to be in a nominally dilated condition with the shells seated against the end retainer.

Figure 7A:
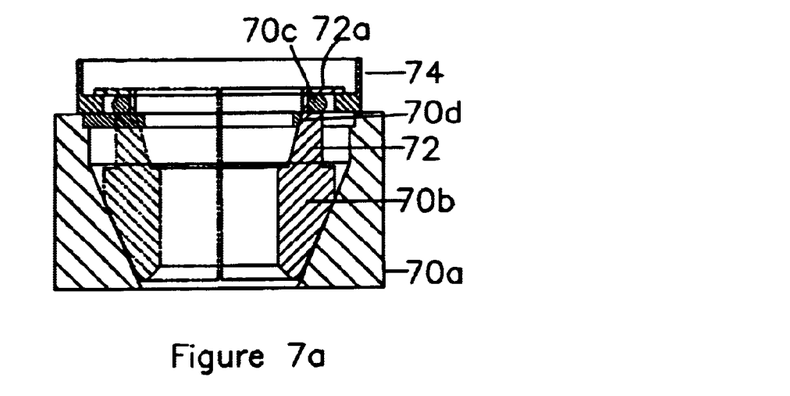
FIGS. 7a–7k show an embodiment of the nut which, in addition to being "quick-insertion," is also "quick-release".
Figure 7B:
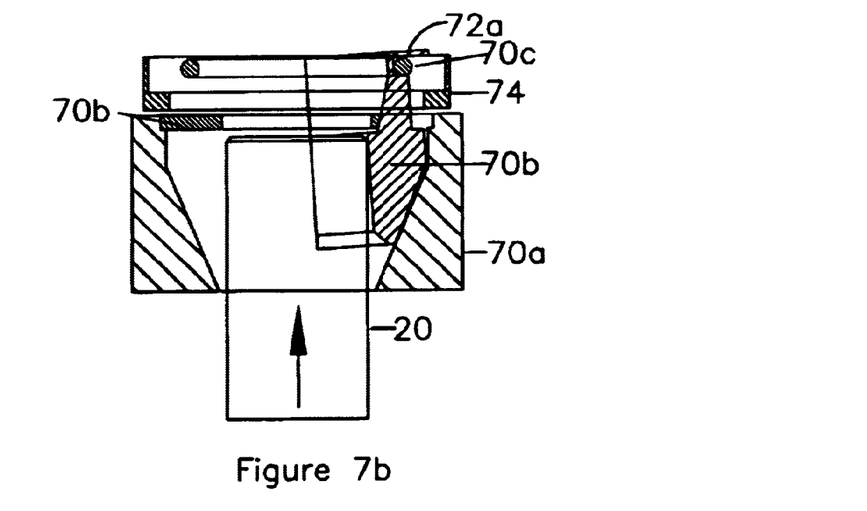
Figure 7C:
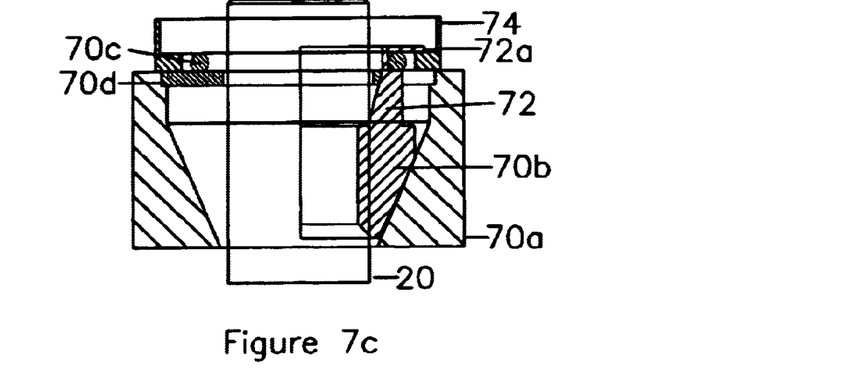

FIGS. 7a–7k show another embodiment of the nut which, in addition to being "quick-insertion," is also "quick-release". In this embodiment, the end retainer 70d serves a number of functions: (1) as a cam to separate the shells radially outwards in order to permit quick-release from the bolt; (2) as a cover/retainer for locating the shells inside the housing; and (3) as a key to prevent rotation of the shells when the nut is being torqued. As shown in the assembled and exploded views of FIGS. 7i and 7j, the end retainer 70d has a number (equal to the number of shells) of slots 70d' machined in it. The shells 70b have extended flanged sections 72 that seat into these slots such that when the shell and retainer assembly are placed in the casing 70a, the flanged sections 72 extends beyond the end retainer 70d. The flanged sections 72 have tapered inner surfaces which bear against the retainer 70d (ring portion) when the shells are moved rearward. A circular spring or O-ring 70c is placed in the grooves 73 formed around the flanged sections 72 of the shells extending beyond the end retainer 70d. This location of the spring enhances the pivoting action of the shells about the retainer ring during insertion of the bolt member in the nut. The quick-insertion operation of this embodiment is identical to first-described one and is illustrated in FIGS. 7a–7c.

Figure 7D:
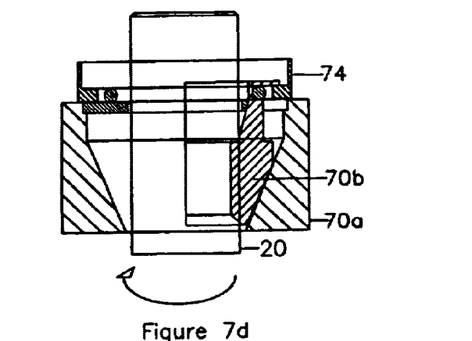
Figure 7E:
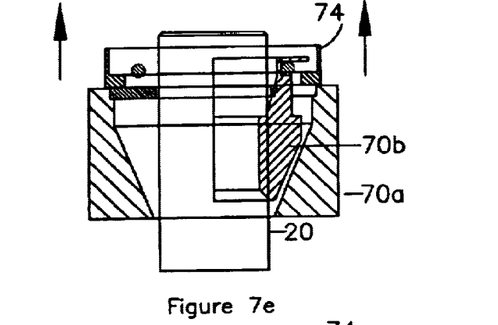
Figure 7F:
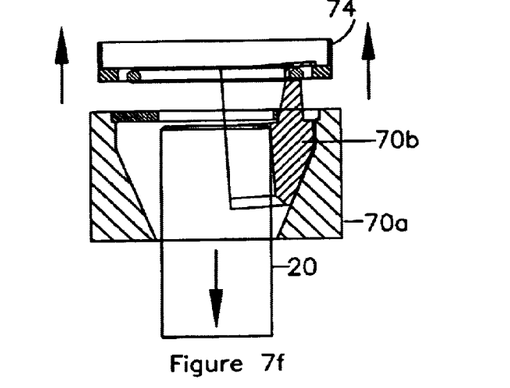
Figure 7G:
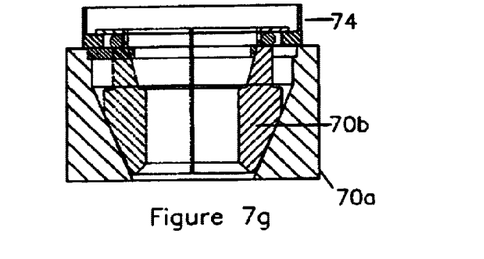
Figure 7H:
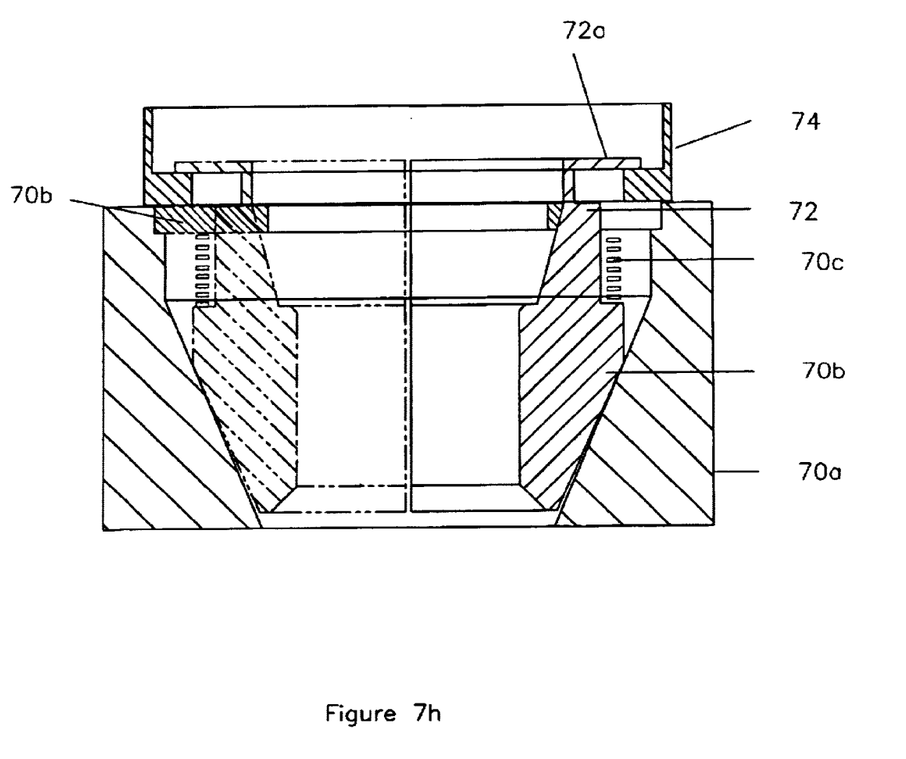
Figures 7I, 7J, 7K:
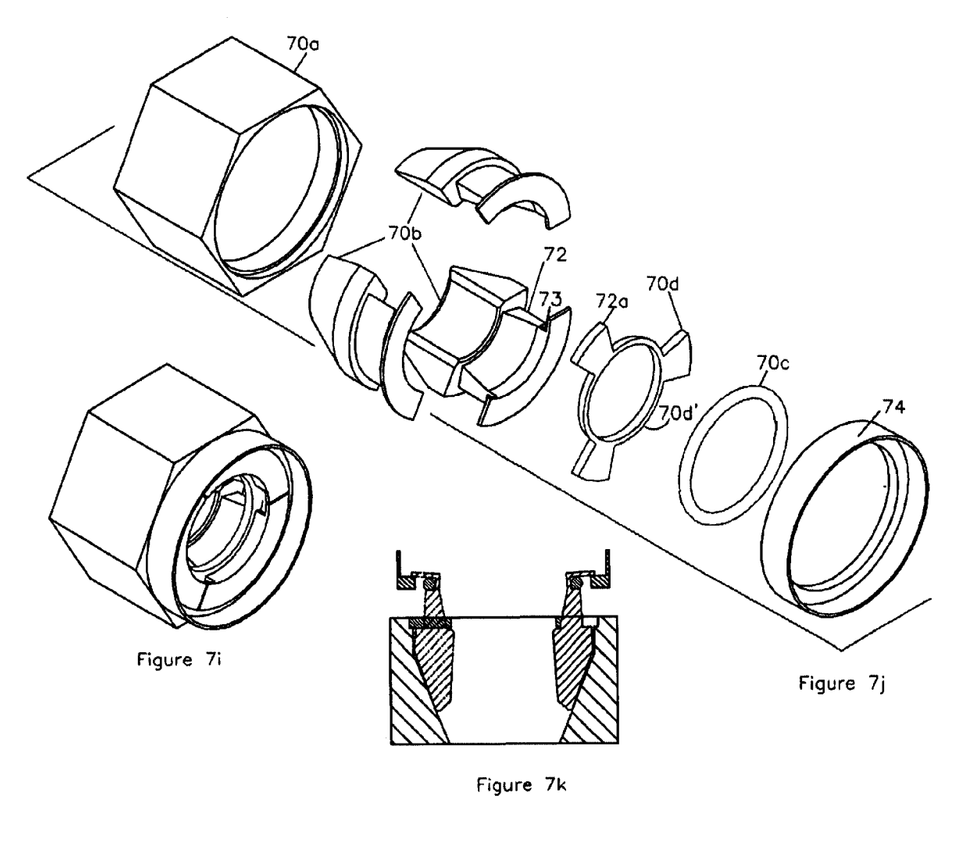

Preloading of the nut is shown in FIG. 7d. A sleeve member 74 retains the flange ends 72a of the flanged sections 72. As shown in FIGS. 7e–7g, after removal of the preload from the fastener assembly and loosening the nut by at least the same number of turns required to commence preload, pulling on the sleeve member 74 in translational motion relative to the casing 70a results in the shells being axially displaced in the direction of the end retainer. Because the inner surfaces of the flanged sections 72 are tapered, they act as a cam which force the shells to be displaced radially in response to the axial displacement. Consequently, the contact between the shell threads and the bolt is decreased, and the bolt can then be readily withdrawn out of the nut without having to unthread the nut. FIG. 7h shows a similar "quick insertion and removal" fastener in which the circular spring is replaced by a wave compression or coil spring located between the shells and the end retainer. Alternatively, the compression wave or coil spring can be located between the sleeve and the casing. The action of this spring will be such that the shells are axially disposed towards the "open" position, near the bottom of the end retainer, and will not axially translate upon contact with the bolt during an insertion operation.

Figure 8A:
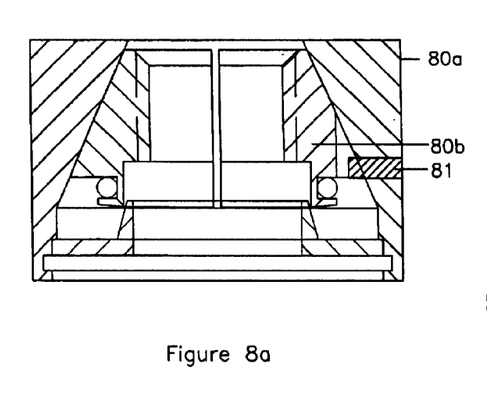
FIGS. 8a, 8b, and 8c show three configurations for keying the shell assembly to the nut casing to prevent relative rotation.
Figure 8B:
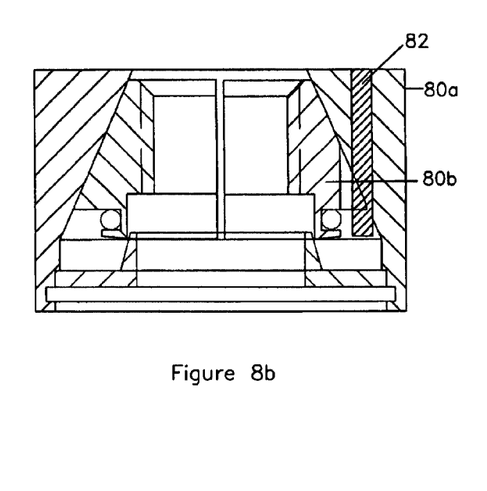
Figure 8C:
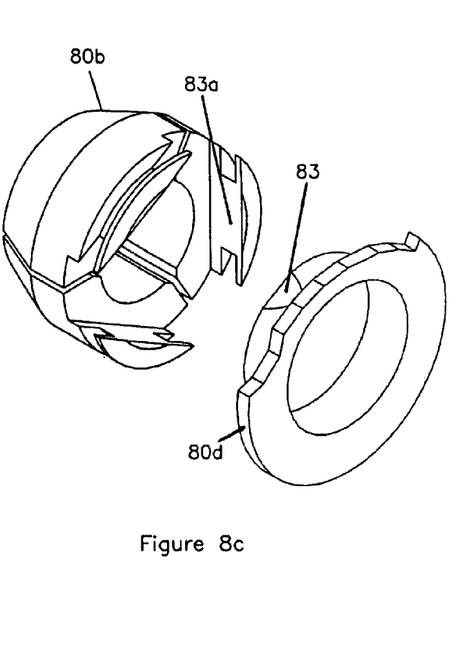

FIGS. 8a, 8b, and 8c show three configurations for keying the shells 80b to the nut casing 80a to prevent relative rotation. The extent to which a key is needed is determined by the taper angle of the shells (or internal surface of the nut housing). The smaller this angle, the higher the wedging forces that will "lock" the shells to the housing with relatively small axial forces. If the angle of the taper is sufficiently small (test results have shown that an included angle of 45 degrees works), then the user can exert enough frictional force between the casing and the shells to prevent relative rotation between the two by simply applying some tension during the tightening/disengage process. The need for a key in that case is eliminated. However, keying the system helps the disengagement process in that it eliminates the need for maintaining tension between the two components. A single key may be sufficient to prevent relative rotation between all elements. However, the keying configuration can be extended, for production reasons, to each shell segment in which case, the number of keys will equal the number of segments.

In FIG. 8a, a radial keying configuration is used in which a single key 81 is located in the casing 80a and interfaces with a groove (or keyseat) in a shell segment 80b. In FIG. 8b, an axial keying arrangement is used in which a single key 82 is located axially in the housing and interfaces with a groove (or keyseat) in a shell segment 80b. In FIG. 8c, a "flats" key configuration employs tapered flat surfaces 83 machined into the end retainer 80d which interfaces with flat surfaces 83a machined into one or more shell segments. Any of these keying configurations can be used with the embodiments of this invention. The keying relationship may also be reversed, that is, the key can be located on the shell (or be integral with it) and the keyseat (or groove) located in the casing.

In summary, the invention utilizes a single spring member and tapered end retainer to control the "quick insertion" operation of the shell assembly. The single spring member with taper not only holds the shell segments together and urges the shell assembly into full contact with the nut casing, but it also provides superior performance of the device in that it reduces the force required to move the shells radially outwards and it enhances the pivoting action of the shells, as compared to the devices of the prior art. For example, the fastener assembly disclosed in U.S. Pat. No. 5,340,252 to Weddendorf uses a coil (compression) spring at the rear end of the casing to urge the shell assembly toward the front end in opposition to a C-shaped clip used to locate the shell segments near the front tapered end of the nut casing. The C-shaped clip is located internally (near the threads) of the shells and is used to assist the engagement process by urging the shells radially outwards when an externally threaded member is introduced into the assembly. The coil spring is required to overcome the force from the C-shaped clip in order to maintain the shells' location toward the front end of the casing. In contrast, the use of a single spring member provides the following distinct advantages: (1) elimination of the coil spring which means a dramatic reduction in the size of the nut assembly; (2) elimination of the C-shaped clip internally of the front end of the shells, which improves manufacturability and assembly; and (3) an overall improvement in performance with respect to insertion forces and the smoothness of the insertion process. The quick-insertion nut design as described herein can form the basis for Worksite Attachment Mechanisms or Worksite Attachment Fixtures (WAM/WAF) type devices for robotic applications. The invention has proven to be highly tolerant to initial misalignments, cannot be cross-threaded and is vibration resistant. The system has the added advantages of being compact, readily manufacturable, and reusable.

It is understood that many modifications and variations may be devised given the above description of the principles of the invention. It is intended that all such modifications and variations be considered as within the spirit and scope of this invention, as defined in the following claims.

What is claimed is:

1. A quick insertion fastener of the type having an internally threaded first member adapted to be quickly attached and tightened on an externally threaded second member inserted therein, wherein the first member comprises:
   (a) a casing having an internal surface at a front part thereof in a frusto-conical shape with a taper angle "α", said front part of the casing being oriented toward the second member for insertion thereof;

(b) a plurality of shell segments radially arranged on a fastener axis to form a displaceable shell assembly contained in said casing, each of said shell segments having a similar shape with an external surface at a front end thereof tapered in a frusto-conical shape with a taper angle "α" corresponding to the taper angle of the internal front surface of said casing and internal threads having a thread height "h" and pitch "p";

(c) a spring member positioned at a rear part of said casing which is arranged to provide an elastic force to elastically retain rear ends of the shell segments to be axially moveable in said shell assembly; and (d) an end retainer provided at the rear part of said casing having a taper engaging the rear ends of the shell segments so as to displace them radially as they are moved axially such that the shell segments are spread apart radially to allow insertion of the second member past the internal threads of the shell segments upon insertion of the second member into the front part of said casing and toward the end retainer at the rear part of said casing.

2. A quick insertion fastener according to claim 1, wherein when the second member is inserted with an insertion force into the front part of the first member, the shell assembly is displaced axially toward the rear part of the casing by a distance "δ" which is equal to h/tan(α/2), and the shell segments are moved apart radially by a distance "h" against the elastic force of the spring member by the taper of the end retainer.

3. A quick insertion fastener according to claim 2, wherein when the insertion force of the second member is released, the shell segments are moved back together by the elastic force of the spring member to engage the threads of the second member, and the shell assembly can be tightened over at most the displacement distance "δ" to bring the external surfaces thereof in abutment with the internal front surface of the casing with a relatively few number of turns N equal to δ/p, or h/(p×tan(α/2)).

4. A quick insertion fastener according to claim 1, wherein the spring member is a radial spring or O-ring inserted in grooves formed on the outside surfaces of flanges extending from the rear ends of the shell segments.

5. A quick insertion fastener according to claim 4, wherein the end retainer is formed by a circumferential retainer ring and a tapered annular collar extending axially therefrom, and the flanges extending from the rear ends of the shell segments are engaged with the tapered annular collar such that as the shell segments are displaced axially toward the end retainer, the rear ends of the shell segments are spread apart radially by engagement with the tapered annular collar.

6. A quick insertion fastener according to claim 5, wherein the shell segments are also pivoted by the spring force of the spring member on the flanges extending from the rear ends of the shell segments such that the front ends of the shell segments are spread apart radially as the front surfaces thereof slide in contact with the internal surface of the casing.

7. A quick insertion fastener according to claim 6, wherein the rear ends of the shell segments have a slight taper on rear surfaces thereof that make contact with the retaining ring of the end retainer to facilitate pivoting of the shell segments.

8. A quick insertion fastener according to claim 6, wherein the tapered annular collar has a height sufficient to allow axial displacement of the shell assembly in engagement therewith by a distance "δ" equal to h/tan(α/2).

9. A quick insertion fastener according to claim 1, wherein the spring member is a radial spring or O-ring inserted in grooves formed on inside surfaces of flanges extending from the rear ends of the shell segments, and the end retainer is formed by a circumferential retainer ring and a tapered annular collar extending axially therefrom which is positioned in engagement with the flanges extending from the rear ends of the shell segments.

10. A quick insertion fastener according to claim 1, wherein the spring member is a wave compression spring having ends coupled between the casing and flanges extending from the rear ends of the shell segments, and the end retainer is formed by a circumferential retainer ring and a tapered annular collar extending axially therefrom which is positioned in engagement with the flanges extending from the rear ends of the shell segments.

11. A quick insertion fastener according to claim 1, wherein the spring member is a wave compression spring formed integrally with a retaining ring as the end retainer, and is shaped in a taper with ends coupled between the rear ends of the shell segments and the retaining ring.

12. A quick insertion fastener according to claim 1, wherein the spring member is a flexure spring formed integrally with a retaining ring as the end retainer, and is shaped in a taper with ends coupled between the rear ends of the shell segments and the retaining ring.

13. A quick insertion fastener according to claim 1, wherein the spring member is a segmented spring having axially extending spring segments formed integrally with a retaining ring as the end retainer, and the spring segments have ends which abut with a tapered internal surfaces formed on the inside of the shell segments.

14. A quick insertion fastener according to claim 1, further comprising an external sleeve member engaged with the rear ends of the shell segments for pulling the shell assembly toward the rear part of the casing for quick disengagement of the first member from the second member.

15. A quick insertion fastener according to claim 14, wherein the spring member is a radial spring or O-ring inserted in grooves formed on outside surfaces of flanges extending from the rear ends of the shell segments, the flanges have inner tapered surfaces which abut with abutment surfaces formed on the end retainer, and the external sleeve member is formed with a circumferential abutment surface engaged with ends of the flanges extending from the rear ends of the shell segments.

16. A quick insertion fastener according to claim 14, wherein the spring member is a wave compression spring having ends coupled between the rear ends of the shell segments and the end retainer, the shell segments have flanges extending from the rear ends thereof which have inner tapered surfaces which abut with abutment surfaces formed on the end retainer, and the external sleeve member is formed with a circumferential abutment surface engaged with ends of the flanges extending from the rear ends of the shell segments.

17. A quick insertion fastener according to claim 1, having a key element coupled between the casing and at least one of the shell segments to prevent relative rotation between the parts when the fastener is subjected to preloading forces.

18. A quick insertion fastener according to claim 17, wherein the key element is one selected from the group consisting of: a radial key element mounted in the casing extending in a radial direction into a keyseat formed in one of the shell segments; an axial key element mounted in the casing extending in an axial direction into a keyseat formed in one of the shell segments; and a flat surfaced key element mounted in the casing engaged in abutting contact with a flat keyseat surface formed in one of the shell segments.

* * * * *